United States Patent
Prasad et al.

(10) Patent No.: US 10,512,034 B2
(45) Date of Patent: Dec. 17, 2019

(54) SENSOR PROVISIONING IN WIRELESS SENSOR NETWORKS

(71) Applicant: BlackBerry Limited, Waterloo (CA)

(72) Inventors: Mahendra Fuleshwar Prasad, Waterloo (CA); Jesse William Bennett, Apex, NC (US); Scott Leonard Dill, Paris (CA); Michael Peter Montemurro, Toronto (CA); Stephen John Barrett, Haywards Heath (GB); Jason Wayne Jantzi, St. Clements (CA); Mark Edward Reaume, Waterloo (CA); Adam Paul Jocksch, Waterloo (CA); Srdjan Damjanovic, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 15/891,096

(22) Filed: Feb. 7, 2018

(65) Prior Publication Data

US 2019/0246344 A1 Aug. 8, 2019

(51) Int. Cl.
*H04W 48/00* (2009.01)
*H04W 8/00* (2009.01)
*H04W 24/08* (2009.01)
*H04W 48/08* (2009.01)
*H04W 52/02* (2009.01)
*H04W 4/80* (2018.01)
*H04W 88/16* (2009.01)
*H04W 84/18* (2009.01)

(52) U.S. Cl.
CPC ............ *H04W 48/17* (2013.01); *H04W 4/80* (2018.02); *H04W 8/005* (2013.01); *H04W 24/08* (2013.01); *H04W 48/08* (2013.01); *H04W 52/0203* (2013.01); *H04W 52/0216* (2013.01); *H04W 52/0254* (2013.01); *H04W 84/18* (2013.01); *H04W 88/16* (2013.01)

(58) Field of Classification Search
CPC ....... H04W 4/80; H04W 12/02; H04W 12/06; H04W 4/008; H04W 4/02; H04W 84/18; H04W 4/21; H04W 72/02; H04W 92/18
USPC ....................................................... 455/41.2
See application file for complete search history.

(56) References Cited

U.S. PATENT DOCUMENTS

| | | | |
|---|---|---|---|
| 2008/0119130 A1* | 5/2008 | Sinha | H04W 12/06 455/1 |
| 2014/0029411 A1 | 1/2014 | Nayak et al. | |
| 2016/0212684 A1* | 7/2016 | Li | H04W 4/38 |

(Continued)

OTHER PUBLICATIONS

PCT International Search Report and Written Opinion issued in International Application No. PCT/US2019/016669 dated Mar. 28, 2019, 14 pages.

*Primary Examiner* — Ajibola A Akinyemi
(74) *Attorney, Agent, or Firm* — Fish & Richardson P.C.

(57) ABSTRACT

A method for sensor provisioning in a wireless sensor network includes determining, at a gateway, that no neighboring gateway is present; in response to no neighboring gateway present, measuring signal strengths from a plurality of sensors; based on the measured signal strengths, identifying a sensor from the plurality of sensors to be paired with the gateway; and in response to identifying the sensor, pairing the gateway and the sensor to enable a secured connection between the gateway and the sensor.

20 Claims, 2 Drawing Sheets

(56) References Cited

U.S. PATENT DOCUMENTS

2018/0004377 A1* 1/2018 Kitchen ............... H04L 67/025
2018/0206187 A1* 7/2018 Savolainen ....... H04W 52/0219

* cited by examiner

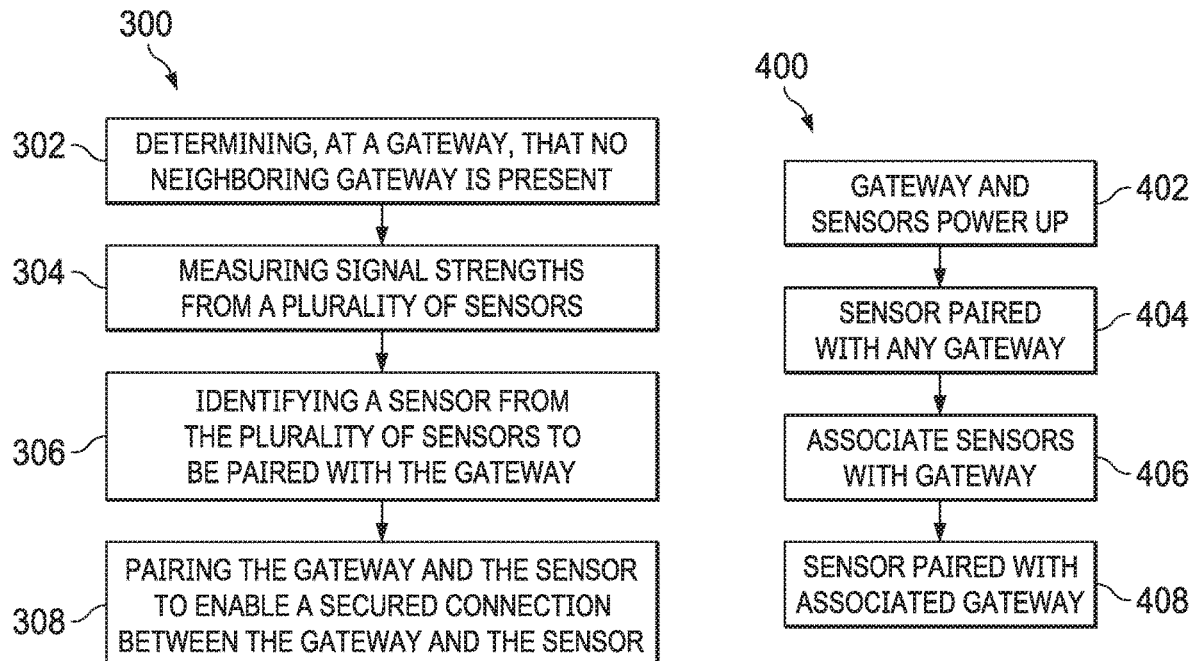
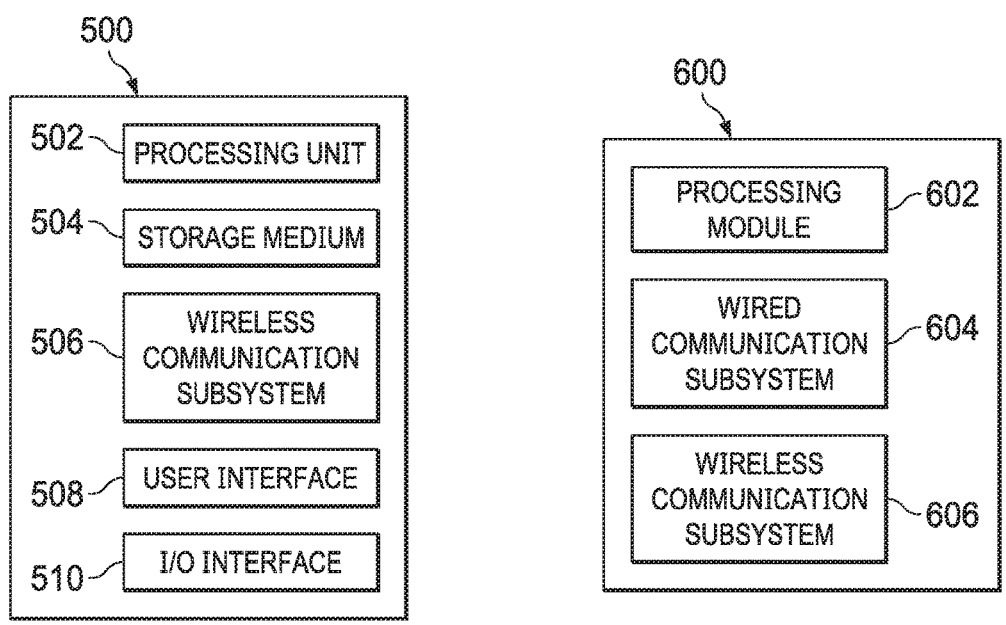

SENSOR PROVISIONING IN WIRELESS SENSOR NETWORKS

TECHNICAL FIELD

This disclosure relates to sensor provisioning in wireless sensor networks.

BACKGROUND

A wireless sensor network can include one or more sensors and one or more gateways that connect the sensors with a server. In some cases, sensors communicate to gateways using short range radio frequency (RF) technologies such as Bluetooth, Bluetooth Low Energy (BLE), Institute of Electrical and Electronics Engineers (IEEE) 802.15 (e.g., 802.15.4), IEEE 802.11 (e.g., IEEE 802.11ah), or a SubGHz technology, while gateways communicate with servers using cellular technologies such as Global System for Mobile communication (GSM), Universal Mobile Telecommunications System (UMTS), Long Term Evolution (LTE), or fifth generation (5G). Sensors are typically battery powered, while gateways can be battery powered or connected to a power source.

DESCRIPTION OF DRAWINGS

FIG. 3 is a flowchart illustrating a second example method for a first exemplary approach of sensor provisioning according to some implementations.

FIG. 4 is a flowchart illustrating an example method for a second exemplary approach of sensor provisioning according to some implementations.

FIG. 5 is a schematic illustrating an example device according to some implementations.

FIG. 6 is a schematic illustrating an example network node according to some implementations.

Like reference numbers and designations in the various drawings indicate like elements.

DETAILED DESCRIPTION

Figure 1:
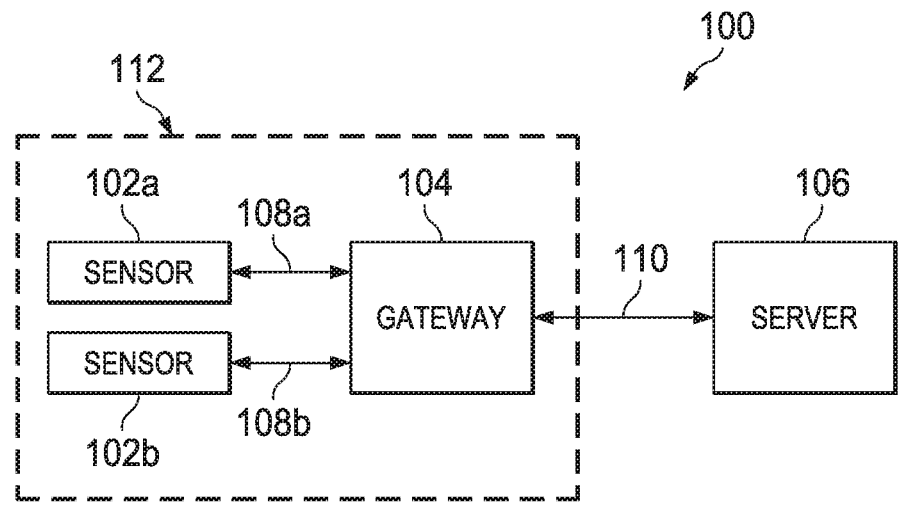
FIG. 1 is an example wireless communication system for sensor provisioning according to some implementations.

The present disclosure is directed to sensor provisioning in wireless sensor networks. A wireless sensor network can include one or more sensors and one or more gateways that connects the sensors with a server. When a sensor is deployed or installed, a provisioning procedure is performed so that the sensor is associated with a gateway and secured communications are enabled between the sensor and the gateway. In some cases, both the sensor and the gateway are battery powered, and provisioning the sensor with reduced power consumptions at both the sensor and the gateway is desirable.

In some implementations, battery-powered sensors can be provisioned in a power efficient manner. For example, an asset (e.g., a trailer) can include one or more sensors and a gateway. The sensors perform measurements and send measurement data to a server through the gateway. The sensor provisioning procedure includes associating the sensors and the gateway on the same asset and pairing the sensors and the gateway. During the pairing process, secured communication links are enabled between the gateway and the sensors (e.g. by exchanging encrypting keys) so that the sensors can securely send measurement data to the gateway. During the sensor provisioning process, the gateway and the sensors can be in power saving modes.

In a first exemplary sensor provisioning approach, the gateway identifies associated sensors (e.g., sensors on the same asset as the gateway) when the gateway is isolated (e.g., no nearby trailers). The gateway then receives a sensor whitelist from the server including information for enabling secured communications between the associated sensors and the gateway. Upon receiving the whitelist, the gateway and the sensors on the same asset can be paired to establish secured communication links for the sensors to send measurement data. In some cases, the sensors and the gateway can enter power saving modes during the provisioning procedure. For example, after the gateway identifies the associated sensors, the gateway and the sensors can synchronize in time and wake up from the power saving modes at the same time (e.g., at a defined and agreed cadence between the gateway and sensors).

In a second exemplary sensor provisioning approach, information (e.g., private/public key or a certificate) for enabling secured communications is embedded in gateways and sensors during factory manufacturing. Once a sensor is installed and powered up, using the embedded security information, the sensor can authenticate and establish a secure channel, and securely send measurement data to the server through any gateway (e.g., the gateway on the same asset as the sensor or a gateway on a nearby asset). At some later time, the server can associate a gateway and sensors with the same asset, which can be done for example when the gateway is isolated from other gateways. More than one pairing process may be required if the sensor originally pairs with a gateway that is on a different asset.

In some cases, after the sensors have been initially provisioned, the gateway can perform further provisioning (e.g., add, delete, or replace a sensor) during normal operations of the gateway. During the normal operations, the gateway may connect to the server infrequently (e.g., every 24 hours). As a result, a new sensor may wait up to 24 hours (or longer than 24 hours) to be provisioned. Various methods can be used to wake up the gateway so that the gateway can receive messages from the server to trigger the provisioning.

FIG. 1 is an example wireless communication system 100 for sensor provisioning according to some implementations. In some implementations, a gateway determines that no neighboring gateway is present. In response to no neighboring gateway being present, the gateway measures signal strengths from a plurality of sensors. Based on the measured signal strengths, the gateway identifies a sensor from the plurality of sensors to be paired with the gateway. In response to identifying the sensor, the gateway pairs with the sensor to enable a secured connection between the gateway and the sensor. The secured connection can use at least one of a Bluetooth, a Bluetooth Low Energy (BLE), an Institute of Electrical and Electronics Engineers (IEEE) 802.15 (e.g., 802.15.4), an IEEE 802.11 (e.g., IEEE 802.11ah), or a SubGHz technology. In some cases, the gateway further receives a whitelist from a server. The whitelist includes security information for pairing the gateway and the sensor, and the gateway pairs with the sensor based on the security information in the whitelist. In some cases, during the sensor provisioning, the gateway can be in a first power saving mode and the sensor can be in a second power saving mode, where the first and second power saving modes are time synchronized. The gateway wakes up at a regular time interval during the first power saving mode. In some cases, the sensor has no motion detection capability, and the sensor wakes up at a same time interval as the gateway during the second power saving mode. In some cases, the sensor has a motion detection capability, and the sensor wakes up in response to detecting a motion event during the second power saving mode.

In some implementations, a power saving mode can be defined by a duty cycle. For example, a device can enter a high power state and enable its radio components for a particular period of time for transmitting or receiving data. Following the particular period of time, the device can disable its radio components and enter a low power state.

In some implementations, during the sensor provisioning process, the gateway can be in a first power saving mode. In the first power saving mode, the gateway wakes up its short range RF components at a regular time interval (e.g., every 15 minutes) for a short duration (e.g., 5 seconds) to communicate with the sensors, and goes to sleep after the short wake-up. In the first power saving mode, the gateway also wakes up its cellular radio components to communicate with the server. For example, the gateway can wake up the cellular radio components less frequently, e.g., every 24 hours.

In some implementations, during the sensor provision process, the sensor can be in a second power saving mode. If the sensor has no motion detection capability, during the second power saving mode, the sensor can be time synchronized with the gateway and wake up its short range RF components at the same time interval as the gateway (e.g., the same every 15-minute interval). If the sensor has motion detection capabilities, during the second power saving mode, the sensor can wake up upon detecting a motion event (e.g., when a sensor starts to move). The sensor with motion detection capabilities is also time synchronized with the gateway so that the sensor can align its wake-up with the gateway's wake-up. For example, upon detecting the motion event, the sensor can wait and wake up at the next 15-minute interval aligned with the gateway's wake-up.

The sensor provisioning, according to methods and systems described herein, enables the sensors to be provisioned in a power efficient manner and reduces power consumptions for both the sensors and the gateway. The described approaches also reduce manual intervention during the sensor provisioning.

The example communication system 100 includes one or more sensors, such as 102a and 102b, and a gateway 104 that connects the sensors 102a and 102b to a server 106. The sensors 102a and 102b can perform measurements. The measurement data is collected by the gateway 104 and forwarded to the server 106. For example, the sensors 102a and 102b can be a Temperature, Pressure, Humidity (TPH) sensor measuring a throttle position, a tire pressure monitoring system (TPMS) sensor measuring a tire pressure, a door detection sensor determining whether the door is opened, or a global positioning system (GPS) providing location data. In some cases, the sensors 102a and 102b can also generate alarms if the measurements indicate abnormal conditions. The sensors 102a and 102b and the gateway 104 can be battery powered. In some cases, the sensors 102a and 102b and the gateway 104 are on the same asset 112 (e.g., a trailer). In some cases, the gateway 104 has motion detection capabilities. For example, the gateway 104 can have an accelerometer to determine whether the gateway is moving or stationary. The sensors 102a and 102b may or may not have motion detection capabilities.

In some implementations, the sensors 102a and 102b communicate with the gateway 104 through links 108a and 108b, respectively. The links 108a and 108b can be wireless links using a short range radio frequency (RF) technology such as Bluetooth, BLE, Institute of Electrical and Electronics Engineers (IEEE) 802.15 (e.g., 802.15.4), IEEE 802.11 (e.g., IEEE 802.11ah), or a SubGHz technology. The server 106 can be a remote server connected to the gateway 104 through a cellular network. The gateway 104 can communicate with the server 106 through a link 110. The link 110 can be a wireless link using a cellular technology, such as Global System for Mobile communication (GSM), Universal Mobile Telecommunications System (UMTS), Long Term Evolution (LTE), or fifth generation (5G). In sum, the sensors 102a and 102b have radio components supporting the short range RF technology, while the gateway 104 has radio components supporting both the short range RF technology and the cellular technology.

Turning to a general description of the elements, the sensors 102a and 102b and the gateway 104 may be referred to but is not limited to as a wireless sensor, wireless meter, user equipment, mobile electronic device, user device, mobile station, subscriber station, portable electronic device, mobile communications device, wireless modem, or wireless terminal. Examples of the sensor and the gateway may include but are not limited to a smart meter, smart sensor, cellular phone, personal data assistant (PDA), smart phone, laptop, tablet personal computer (PC), pager, portable computer, portable gaming device, wearable electronic device, test equipment, gambling machine, car/vehicle, notice board, home appliance, or other mobile communications device having components for communicating data via a wireless communication network. The wireless communication network may include a wireless link over at least one of a licensed spectrum and an unlicensed spectrum. In some cases, the wireless link can use one or more licensed spectrums, one or more unlicensed spectrums, or a combination of licensed and unlicensed spectrums. Other examples of the sensor and the gateway include mobile or fixed electronic devices. The sensor and the gateway may include a Mobile Equipment (ME) device and a removable memory module, such as a Universal Integrated Circuit Card (UICC) that includes a subscriber identity module (SIM), a Universal SIM (USIM), or a Removable User Identity Module (R-UIM).

While elements of FIG. 1 are shown as including various component parts, portions, or modules that implement the various features and functionality, nevertheless these elements may instead include a number of sub-modules, third-party services, components, libraries, and such, as appropriate. Furthermore, the features and functionality of various components can be combined into fewer components as appropriate. FIGS. 2-6 and associated descriptions provide additional details for these implementations.

In some cases, when devices (sensors and gateways) are assembled and programmed in a factory, a factory script can be run to create a certificate for each device. The certificate can include a public key of the device for establishing secured communication links with other devices. The factory script can upload the information of each device (for example, the certificate and an International Mobile Equipment Identity (IMEI) of the device) to the server. The factory script can also copy the certificate to the device. As a result, the server knows about the devices.

In some cases, when a customer installs devices on an asset (e.g., one or more sensors and a gateway), the customer can provide a dispatcher application with a list of the devices on the asset so that the devices are associated with the asset. For example, the customer can install the dispatcher application on a mobile phone. The dispatcher application allows the customer to login to the server. The customer can use the dispatcher application to scan or read the QR code or bar code of each device and send the information to the server. The bar code or QR code can be scanned without powering up the gateway and the sensors. As a result, the server can associate the sensors with the gateway as well as associate the sensors and the gateway with a particular asset (e.g., trailer number 123).

In some cases, the gateway can receive a sensor whitelist from the server. The whitelist can include identities of the sensors that are on the same asset as the gateway. The whitelist can also include security information of the sensors and the gateway so that secured communication links between the gateway and the sensors can be established. For example, the whitelist can include public keys or certificates of the sensors so that the gateway can encrypt data transmitted to the sensors.

A First Exemplary Approach for Sensor Provisioning

Figure 2:
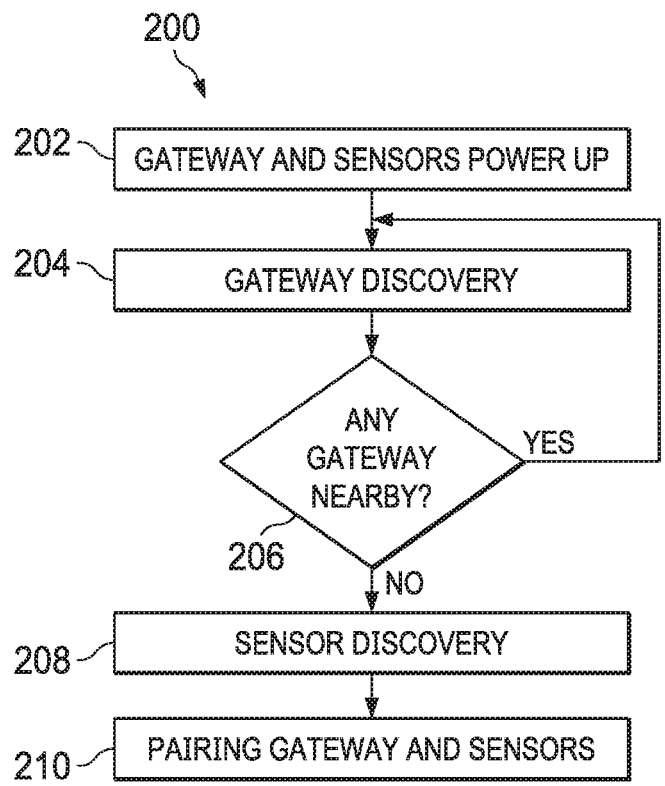
FIG. 2 is a flowchart illustrating an example method for a first exemplary approach of sensor provisioning according to some implementations.

FIG. 2 is a flowchart illustrating an example method 200 for a first exemplary approach of sensor provisioning according to some implementations. For clarity of presentation, the description that follows generally describes method 200 in the context of the other figures in this description. However, it will be understood that method 200 may be performed, for example, by any suitable system, environment, software, and hardware, or a combination of systems, environments, software, and hardware as appropriate. In some implementations, various steps of method 200 can be run in parallel, in combination, in loops, or in any order.

At block 202, one or more sensors and a gateway are installed on an asset and powered up. In some implementations, as will be discussed later, there might be a long duration from when the sensors and the gateway are powered up till when the sensors and the gateway are provisioned (e.g., the gateway discovery 204 and the sensor discovery 208 may take a long time). Therefore, for power saving, the sensors and the gateway can operate in power saving modes during the gateway discovery 204, the sensor discovery 206, or both. In some implementations, the sensors and the gateway can be continuously kept on (i.e., no power saving modes) during the gateway discovery 204, the sensor discovery 206, or both.

For example, after powering up, each sensor can advertise or broadcast its identity (e.g., a Bluetooth name or address). After the gateway detects the sensors (e.g., by detecting the advertised identities), the gateway can request or instruct the sensors to enter a power saving mode. The gateway can also enter a power saving mode. The gateway and the sensors can be time synchronized so that the sensors and the gateway can wake up from the power saving modes at the same time. For instance, the gateway can wake up at a regular time interval (e.g., every 15 minutes) for a short duration (e.g., 5 seconds), and go to sleep after the short wake-up. During a wake-up, the gateway can turn on the short range RF radio components, the cellular radio components, or both to enable communications with the sensors, the server, or both. For example, the gateway can wake up the short range RF components every 15 minutes and the cellular components every 24 hours. In some implementations, the sensors that do not have motion detection capabilities wake up at the same time interval as the gateway (e.g., every 15 minutes), while the sensors that have motion detection capabilities can be in a deep sleep state and wake up upon detecting a motion event (e.g., detect that the sensor starts to move, that the sensor is in motion, or that the sensor stops). For example, when the asset starts to move, the sensor with motion detection can wake up at the next 15-minute interval to align with the gateway's wake-up. As a result, during the provisioning process, the sensors with motion detection can be more power-efficient than the sensors without motion detection. When the sensor wakes up, the sensor turns on the short range RF radio components to enable communications with the gateway. From block 202, method 200 proceeds to block 204.

At block 204, the gateway starts a gateway discovery process to detect the presence of other gateways nearby. In some cases, multiple gateways can be close to each other. For example, multiple trailers can be parked next to each other in a trailer park. The gateway discovery process can occur when the short range RF radio components of the gateway are turned on. The gateway discovery process can be performed by detecting short range RF signals from other gateways. For instance, each gateway can advertise or broadcast its identity (e.g., a Bluetooth name or address). By detecting the advertised identities, a gateway can determine if there are other gateways nearby, for example, by determining if the detected identity includes a character string "gateway". In some cases, the gateway can determine that no nearby gateway is present if received signal strength indicators (RSSIs) of other gateways are below a threshold. At block 206, if the gateway detects another gateway nearby, method 200 goes back to block 204. Otherwise, method 200 proceeds to block 208.

At block 208, when the gateway detects no other gateways nearby, the gateway starts a sensor discovery process to determine sensors associated with the gateway (e.g., sensors on the same asset as the gateway). For example, a trailer may leave the trailer park or the neighboring trailers may leave the trailer park so that no nearby gateway is present. In some cases, the sensor discovery process is used for the gateway to determine the sensors on the same asset as the gateway, and to make sure that no other nearby or unknown sensors are falsely associated with the gateway. For example, the gateway can determine RSSIs of the short range RF signal from each sensor. In some cases, RSSIs can be acquired at different times. For a particular sensor, if the RSSIs at different times are close to each other (e.g., a variance of the RSSIs at different times is within a threshold) and an averaged RSSI (e.g., an average of the RSSIs at different times) exceeds a certain value, the gateway can determine that the particular sensor is on the same asset as the gateway. In some cases, if the RSSIs of a particular sensor at different times become smaller and smaller, the gateway can determine that the particular sensor is not on the same asset as the gateway and that the asset may be moving away from the particular sensor. By analyzing received signal strengths of the sensors, the gateway can automatically determine the sensors on the same asset as the gateway. In some cases, RSSIs of each sensor can be factory calibrated or characterized to ease the provisioning process.

In some implementations, if the sensors and the gateway are not in power saving modes during the gateway discovery or the sensor discovery, after the gateway identifies the sensors on the asset, the gateway and the sensors can be time synchronized, and both the sensors and the gateway can enter power saving modes (e.g., the gateway can instruct the sensors to enter the power saving mode). In some implementations, if the sensors and the gateway are in power saving modes during the gateway discovery, when the asset starts to move, the sensor with motion detection can exit the deep sleep mode and the gateway can measure the sensor's RSSIs to perform the sensor discovery.

At block 210, the gateway pairs with the sensors based on a sensor whitelist from the server. The sensor whitelist can include identities, radio information (e.g., radio technology and operating channel/band), and security information of the sensors to be provisioned. For example, the security information may include a certificate (or public key) of each sensor that the gateway can use to encrypt data transmitted to the sensor. During the pairing, the gateway and the sensor can exchange keys (e.g., public keys for data encryption) to mutually authenticate and enable a secured communication link between the gateway and the sensor. In some cases, each sensor and the gateway has public and private keys stored on devices during factory manufacturing and authenticated by the certificate from the server.

In some implementations, for the sensor with motion detection, when the asset starts to move, the sensor can detect the motion event (e.g., the asset starts to move) and exit the power saving mode (for example, wake up at the next 15-minute interval to align with the gateway's wake-up). Upon the sensor and the gateway detecting the motion event (the gateway has the motion detection capability), both the sensor and the gateway can keep the short range RF radio components on for a specified duration (e.g., 15 minutes) so that the gateway can perform the sensor discovery (e.g., measuring sensor RSSIs) and further pair with the sensor based on the whitelist. For the sensor without motion detection, after the gateway detects that the asset starts to move, the gateway can send a message to the sensor during the sensor wake-up period and instruct the sensor to keep short range RF radio components on for a specified duration until the sensor is paired with the gateway. In some cases, the gateway also instructs sensors to wake up at a specified interval to save power.

In some cases, if the asset is in stationary, a sensor can pair to a gateway after the sensor discovery. However, in some cases, wrong sensors (e.g., sensors not on the same asset as the gateway) may be synchronized with the gateway. After the gateway gets the whitelist from server, a wrong sensor can be instructed to pair with a new gateway that the sensor sees during the sensor discovery process. This ensures that sensor also enters the power save mode while the asset is in stationary.

In some implementations, before a sensor is paired with the gateway, the sensor can wake up and enter a discovery mode for a certain time period (e.g., 16 minutes), waiting for a discovery request from the gateway for pairing. If the 16 minutes expires without pairing, the sensor sleeps for a certain time duration (e.g., 15 minutes) before entering the discovery mode again. In some cases, the sensors are configured not to respond to discovery requests from a gateway other than the gateway that is associated with the sensors.

In some implementations, the gateway can receive a provisioning request from the server including a sensor whitelist. Upon receiving the provisioning request, the gateway turns on the short range RF components and begins searching for the sensors on the whitelist. In some cases, the gateway can wake up at a certain time interval for searching the sensors. For example, the gateway wakes up every 15 minutes and searches for the sensors targeted for pairing every one minute. If the gateway does not find any sensors, the gateway aborts the process and enters the power saving mode (e.g., wake up every 15 minutes for 5 seconds).

In some implementations, the sensor provisioning can also happen while the gateway and the sensors are stationary. For example, after the gateway discovery 204, both the gateway and the sensors are kept on for a certain time period (e.g., 30 minutes) to perform the sensor discovery 206 and the pairing process 210. For example, the gateway can instruct the sensors to be kept on for 30 minutes.

In some implementations, after the sensors are provisioned and during the normal operation, the sensors and the gateway can be in power saving modes. The power saving modes in normal operation may be the same as or different than the power saving modes used in the sensor provisioning (e.g., during the gateway discovery 204 and the sensor discovery 206). For example, during the normal operation, the gateway can wake up at a certain time interval (e.g., every 15 minutes) to receive data from the sensors (e.g., sensor measurement data or emergency alarms). The sensors and the gateway can be time synchronized for the 15-minute cadence so that the sensor's wake-up is aligned with the gateway's wake-up. The sensor can wake up when the sensor has data to send to the gateway (e.g., the sensor may not wake up at every 15 minutes unless it has data to send). For instance, the sensor can queue the data to be sent to the gateway and wait for the next 15-minute interval to wake up. During the normal operation (or while the asset is stationary), the gateway may connect to the server infrequently (e.g., every 24 hours) for forwarding the sensor measurement data unless there are emergency alarms. For example, the gateway wakes up the short range RF radio components for a very short duration (e.g., <5 seconds) every 15 minutes to listen to measurement data and emergency alarms (e.g., door open/close or TPH out of range) from the sensors. When there are emergency alarms from the sensors, the gateway wakes up the cellular radio components and forward the emergency alarms to the server without waiting for the 24-hour interval. Otherwise, the gateway wakes up every 24 hours to forward the sensor measurement data.

In some implementations, the gateway and the sensors can be configured during the factory manufacturing. However, this may constrain the gateway and the sensors to be shipped together to the customer. For example, during the factory manufacturing, an ID (e.g., a media access control (MAC) address) as well as keys (e.g., a public/private key pair) can be generated and burned for each device (sensor or gateway). In some cases, at the factory, a set of sensors and a gateway can be configured as a group to be installed on an asset. Each sensor can be burned with the public key of the gateway, and the gateway can be burned with each sensor's public key. By doing so, the sensor can use the gateway's public key to encrypt data to the gateway, and the gateway can use the sensor's public key to encrypt data to the sensor. In some cases, for the sensors that are not shipped together with the gateway, or when adding a new sensor to an asset and associating the new sensor with the gateway, the server may send messages to the gateway to overwrite or update the information configured at the manufacturing.

In some implementations, during the factory manufacturing, each device (sensor or gateway) is configured or burned with a public/private key pair. After a set of sensors and a gateway are installed on an asset, the server can configure the gateway with the public keys of the sensors (e.g., the server can send the public keys of the sensors to the gateway). The sensors can be programmed or configured to trust a gateway that knows its public key. In some cases, the sensors can be given the public key of the gateway (e.g., the gateway can send its public key to the sensors).

FIG. 3 is a flowchart illustrating a second example method 300 for a first exemplary approach of sensor provisioning according to some implementations. For clarity of presentation, the description that follows generally describes method 300 in the context of the other figures in this description. However, it will be understood that method 300 may be performed, for example, by any suitable system, environment, software, and hardware, or a combination of systems, environments, software, and hardware as appropriate. In some implementations, various steps of method 300 can be run in parallel, in combination, in loops, or in any order.

At block 302, a gateway determines that no neighboring gateway is present (as discussed in the gateway discovery 204). At block 304, in response to no neighboring gateway being present, the gateway measures signal strengths from a plurality of sensors (as discussed in the sensor discovery 208). At block 306, based on the measured signal strengths, the gateway identifies a sensor from the plurality of sensors to be paired with the gateway (as discussed in the sensor discovery 208). At block 308, in response to identifying the sensor, the gateway pairs with the sensor to enable a secured connection between the gateway and the sensor (as discussed in the pairing process 210).

A Second Exemplary Approach for Sensor Provisioning

As discussed above, for security reasons, the sensors do not send measurement data to the gateway until secured communication links are enabled. In the first exemplary approach, the sensors wait for the gateway to receive a whitelist from the server before the sensors can be paired with the gateway and securely send measurement data to the gateway. In the second exemplary approach, once the sensors and the gateway are powered on, the sensors can send measurement data to the gateway using secured links without waiting for the whitelist from the server.

For enabling secured links without the whitelist from the server, each device (sensor or gateway) can be configured at the factory with public and private keys, a certificate authority public key (e.g., a BLACKBERRY Certificate Authority public key), and a certificate. In some cases, the certificate includes the device's public key. The certificate can be signed by a certificate authority that confirms to the receiver of the certificate that the device with which the receiver is communicating is indeed an authorized product (e.g., a true BLACKBERRY product).

For securing the communication from Node 2 (a gateway or a sensor) to Node 1 (a sensor or a gateway), Node 1 can provide its public key within a certificate to Node 2. Node 2 confirms that the certificate is correctly signed (e.g., the certificate is issued by BLACKBERRY), that Node 1 can be trusted as being an authorized node (e.g., a true BLACKBERRY node), and that the public key can be trusted. As a result, the application layer integrity protection and confidentiality is obtained by Node 2 sending data to Node 1 using Node 1's public key. After receiving the data, Node 1 uses Node 1's private key for data decryption and integrity confirmation. The similar procedure occurs in reverse for securing Node 1 to Node 2 communications. As a result, any sensor can be paired with any gateway for secured communications. The secure communication between nodes that is established using the certificates as described above may be used to agree a symmetric key which is then used in subsequent communications for providing confidentiality and integrity protection on the local area connection between the sensor and the gateway.

In some implementations, devices (sensors and gateways) may also be configured with device IDs and a local area connection key for use on a local area connection (e.g., short range RF connections between sensors and gateways). The same local area connection key can be pre-configured in all sensors and all gateways.

FIG. 4 is a flowchart illustrating an example method 400 for a second exemplary approach of sensor provisioning according to some implementations. For clarity of presentation, the description that follows generally describes method 400 in the context of the other figures in this description. However, it will be understood that method 400 may be performed, for example, by any suitable system, environment, software, and hardware, or a combination of systems, environments, software, and hardware as appropriate. In some implementations, various steps of method 400 can be run in parallel, in combination, in loops, or in any order.

At block 402, one or more sensors and a gateway are installed on an asset and powered up. At block 404, each sensor identifies a gateway for pairing so that the sensor can securely send sensor data to the server through the gateway using, e.g., the public and private keys configured at the factory. In some cases, the sensor can compare signal strengths from surrounding gateways and pair with the gateway having the strongest signal strength. For example, assume that a particular trailer is parked in a trailer park next to other trailers. After the sensors and the gateway are installed on the particular trailer and powered up, some sensors may send sensor data reports to the server through the gateway on the particular trailer, and some sensors may send data through the gateways on nearby trailers. The sensor data report that is sent from a sensor to the server can be tagged with a device ID of the sensor (as discussed above, each device can be configured with a device ID). For example, the sensor data report can include the device ID. Although any sensor can be paired with any gateway, there is a preferred gateway for each sensor (e.g., the preferred gateway is the gateway which is attached to the same asset as the sensor). If a sensor pairs to a non-preferred gateway, ultimately the sensor will lose contact and will attempt to connect to another gateway, and at some point will pair with the preferred gateway after which the sensor can be notified that it should remain paired with that gateway (e.g., as will be discussed below, the sensor can be informed once an association of the sensor and a gateway has been established).

At block 406, the server identifies associated sensors (e.g., the sensors on the same asset as the gateway). In some cases, the gateway can provide and update its location (i.e., the asset location) to the server. The server, which tracks location of all assets, knows when a particular gateway is isolated (e.g., no other assets in the vicinity). For example, the server determines that a particular gateway is isolated if there are no other gateways within a threshold distance from the particular gateway. As a result, when the particular gateway is isolated, any sensor data reports that the server receives via the particular gateway are from the sensors on the same asset as the particular gateway. In this way, based on the device IDs in the sensor data reports, the server can determine the sensors that are associated with and installed on the same asset as the particular gateway. In some cases, the server can take other information into account to improve the confidence in the efficacy of the association. For example, if the server receives a sensor data report or multiple sensor data reports via a gateway while the gateway is at a speed (e.g., the gateway has a speed more than a threshold), this greatly increases the likelihood that the gateway and the sensor(s) are on the same asset. In some cases, if the gateway or the sensors indicate to the server that other gateways have not been detected for some time period, this may also be indicative that the gateway and the sensor(s) are on the same asset.

In some cases, a manual method can be used to associate a gateway with an asset. For example, a web page login on the server can be used to associate a gateway bar code with a particular asset (e.g., Trailer number 156). For instance, a mobile application can be used by a customer to login to the server. The customer can use the mobile application to scan the bar codes of the gateway and the asset so that the server associates the gateway and the asset. As discussed earlier, the server can also determine the sensors and the gateway on the same asset. As a result, the server establishes an association among the sensors, the gateway, and the asset.

In some cases, prior to a sensor (or a device ID of a sensor) being associated with a particular asset, the sensor data from that device ID can be stored in the server in a "temporary record", where the temporary record contains sensor data that is not associated with any particular asset. Once the association between a sensor and a particular asset is achieved, the server can copy the "temporary record" to an "asset record" (the record that contains sensor data for a particular asset).

At block 408, the gateway is paired with the associated sensors installed on the same asset. In some cases, once the server has established the association between a gateway, an asset and sensors, the server can inform the gateway of the sensors that are installed on the same asset as the gateway, and this information can be conveyed also to the sensors (e.g., the gateway can inform the sensors), wherein from that time onwards sensors will only pair with that particular gateway.

In some cases, for power saving, a sensor and a gateway can agree on a wake-up time and period once the sensor and the gateway are paired. However, how to achieve the initial pairing in a battery efficient manner can be challenging. Furthermore, if a pairing is lost (e.g., the sensor was connected to a non-preferred gateway that has now moved out of range), establishing a pairing between the sensor and a new gateway in a battery efficient manner can be challenging.

For addressing these challenges, a variety of options can exist. For example, the sensor and the gateway can run a common real-time clock and periodically wake up at predefined times (for example, on the hour every few hours, such as 1 am, 4 am, 7 am and so on) to attempt pairing on the occasions when the sensor and the gateway are in a state where there is a known lack of pairing. From the gateway perspective, the gateway may know that there is a "lack of pairing" if the gateway has been pre-configured with information that the gateway is supposed to be paired with four sensors, but the gateway is paired with three sensors. The sensor knows whether or not it is currently paired with a gateway.

In some implementations, the gateway and the sensor can monitor the connection between the gateway and the sensor to determine whether the connection is still alive. The gateway/sensor can maintain a counter of missed communications attempts (e.g., 10). If the count of successive failed attempts reaches a threshold, the sensor/gateway considers its pairing to have failed. In the sensor, this triggers the sensor to go back to the pairing mode. In the gateway, this triggers the gateway to report to the server that the gateway has lost contact with the sensor. In some cases, externally triggers can be used as a synchronization trigger. For example, a light sensor can detect dusk or dawn and cause a synchronization opportunity (e.g., about every 12 hours) for the gateway and the sensor to attempt pairing. Other external triggers such as wake-up radio, near-field communication (NFC), or push buttons can also be used.

Waking Up a Gateway for Sensor Provisioning During Normal Operations

In some cases, a customer may want to add, delete, or replace a sensor on an asset while the rest of the sensors and the gateway are in normal operation. However, waking up a gateway for sensor provisioning without disturbing normal operations of other sensors and the gateway may be challenging.

In some implementations, during the normal operation after the sensors have been provisioned as in FIGS. 2-4, the sensors and the gateway can be in power saving modes. As discussed above, the power saving mode in normal operation may be the same as or different than the power saving modes used in the sensor provisioning. During the normal operation (or the asset is stationary), the gateway may connect to the server infrequently (e.g., once every 24 hours) unless the gateway receives emergency alarms from the sensors. In this case, after a new sensor is installed on the asset, the gateway may wait for up to 24 hours to receive information of the new sensor from the server. As a result, the new sensor may have to wait up to 24 hours to be paired with the gateway. Keeping the new sensor on for 24 hours may drain the new sensor's battery power.

In some implementations, an application that uses the same short range RF technology as the gateway-sensor link can be used to wake up the gateway to perform provisioning (e.g., add, delete, or replace a sensor). For example, if the gateway communicates with the sensors using BLE, a BLE application (e.g., a mobile application that uses BLE) with authorized keys can be used to wake up the gateway for pairing the new sensor with the gateway. In some cases, the BLE application can keep advertising for a certain duration (e.g., up to 15 minutes) to wake up the gateway. In some cases, the gateway wake-up period can be reduced (e.g., from 15 minutes to 5 minutes).

In some implementations, the server can wake up the gateway to perform provisioning. When operated in a power saving mode (e.g., LTE power saving mode (PSM)), the gateway may wake up to perform a periodic tracking area update (TAU) procedure with the cellular network and receive a mobile terminated message from the server (either in connected mode or during the PSM active time). For example, the TAU period can be configured as one hour, and the gateway wakes up the cellular radio components every hour and checks for the message (e.g., short message service (SMS)) from the server. Upon receiving the message, the gateway wakes up the short range RF radio components and starts sensor provisioning.

In some implementations, the gateway can be configured in an Extended Discontinuous Reception (eDRX) mode (e.g., LTE eDRX) with the lowest duty cycle (e.g., wake up every 44 minutes). In this case, the gateway can turn on the cellular radio components based on the eDRX configuration and wait for the message from the server. Upon receiving the message from the server, the gateway can wake up short range RF components to perform sensor provisioning.

In some implementations, a server can send Internet Protocol (IP) messages to a device (e.g., the gateway) even when the device is in the PSM deep sleep. For example, the IP messages can be stored for a long period of time in a 3GPP serving gateway (S-GW) (a network node in a core network) and pushed to the device when the device wakes up. In some cases, through 3GPP Service Capability Exposure Function (SCEF), the server can configure an event on the cellular network (e.g., the event of when the device connects to the cellular network). In other words, the server can be notified when the device wakes up and connects to the cellular network. Upon being notified of the device's wake-up, the server can push the IP message to the device.

FIG. 5 is a schematic illustrating an example device 500 according to some implementations. The device 500 can be a gateway 104 or a sensor 102a or 102b. The device 500 includes a processing unit 502, a computer-readable storage medium 504 (for example, read-only memory (ROM) or flash memory), a wireless communication subsystem 506, a user interface 508, and an input/output (I/O) interface 510. The processing unit 502 can include one or more processing components (alternatively referred to as "processors" or "central processing units" (CPUs)) configured to execute instructions related to one or more of the processes, steps, or actions described above in connection with one or more of the implementations disclosed herein. The processing unit 502 can also include other auxiliary components, such as random access memory (RAM) and ROM. The computer-readable storage medium 504 can be embodied by a non-transitory medium configured to store an operating system (OS) of the device 500 and various other computer-executable software programs for performing one or more of the processes, steps, or actions described above.

The wireless communication subsystem 506 may be configured to provide wireless communications for data information or control information provided by the processing unit 502. The wireless communication subsystem 506 can include, for example, one or more antennas, a receiver, a transmitter, a local oscillator, a mixer, and a digital signal processing (DSP) unit. In some implementations, the subsystem 506 can support multiple input multiple output (MIMO) transmissions. In some implementations, the receivers in the wireless communication subsystems 506 can be an advance receiver or a baseline receiver. Two receivers can be implemented with identical, similar, or different receiver processing algorithms.

The user interface 508 can include, for example, one or more of a screen or touch screen (for example, a liquid crystal display (LCD), a light emitting display (LED), an organic light emitting display (OLED), a microelectromechanical system (MEMS) display), a keyboard or keypad, a trackball, a speaker, and a microphone. The I/O interface 510 can include, for example, a universal serial bus (USB) interface. A skilled artisan will readily appreciate that various other components can also be included in the example device 500.

FIG. 6 is a schematic illustrating an example network node 600 according to some implementations. The network node 600 can be a server 106. The illustrated network node 600 includes a processing module 602, a wired communication subsystem 604, and a wireless communication subsystem 606. The wireless communication subsystem 606 can transmit and receive data traffic and control traffic to and from gateways. In some implementations, the wireless communication subsystem 606 may include a receiver and a transmitter. The wired communication subsystem 604 can be configured to transmit and receive control information between other network nodes via backhaul connections. The processing module 602 can include one or more processing components (alternatively referred to as "processors" or "central processing units" (CPUs)) capable of executing instructions related to one or more of the processes, steps, or actions described above in connection with one or more of the implementations disclosed herein. The processing module 602 can also include other auxiliary components, such as RAM, ROM, secondary storage (for example, a hard disk drive, flash memory or other non-transitory storage medium). The processing module 602 can execute certain instructions and commands to provide wireless or wired communication, using the wired communication subsystem 604 or a wireless communication subsystem 606. Various other components can also be included in the network node 600.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation descried above should not be understood as requiring such separation in all implementations, and it should be understood that the described program components and systems can generally be integrated together in a signal software product or packaged into multiple software products.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps is not implied by the order they appear in the claims.

Some aspects of the described sensor provisioning approaches can be set out in the following numbered clauses.

1. A method, comprising: receiving, at a server, location data of a plurality of gateways; based on the location data, identifying a first gateway from the plurality of gateways that is isolated from other gateways; receiving a sensor data report from the identified first gateway, wherein the sensor data report includes a sensor ID, and the sensor data report is generated by a sensor corresponding to the sensor ID; in response to receiving the sensor data report from the first gateway, determining that the sensor corresponding to the sensor ID is associated with the first gateway; and sending a message to the first gateway indicating that the sensor is associated with the first gateway.

2. The method of clause 1, further comprising prior to determining that the sensor is associated with the first gateway: receiving a second sensor data report from a second gateway, wherein the second sensor data report is generated by the sensor, and the second sensor data report includes the sensor ID; and storing the second sensor data report in a temporary record.

3. The method of clause 2, further comprising after determining that the sensor is associated with the first gateway: copying the second sensor data report from the temporary record to an asset record associated with the first gateway.

4. The method of clause 2, wherein, prior to determining that the sensor is associated with the first gateway, the sensor is paired with the second gateway.

5. The method of clause 2, wherein, during a factory manufacturing stage and prior to determining that the sensor is associated with the first gateway, the second gateway is provisioned with a certificate including a public key.

6. The method of clause 5, wherein, prior to determining that the sensor is associated with the first gateway, the second gateway sends the certificate to the sensor, and the sensor uses the public key in the certificate to encrypt the second sensor data report.

7. The method of clause 1, wherein, after sending the message to the first gateway indicating that the sensor is associated with the first gateway, the sensor is informed to pair with the first gateway.

8. The method of clause 1, wherein the first gateway and the sensor are on a same asset.

The invention claimed is:

1. A method, comprising:
   determining, at a gateway, that no neighboring gateway is present;
   in response to determining that no neighboring gateway is present, starting, by the gateway, a sensor discovery process, wherein the sensor discovery process comprises:
      measuring signal strengths from a plurality of sensors;
      based on the measured signal strengths, identifying a sensor from the plurality of sensors to be paired with the gateway; and
      in response to identifying the sensor, pairing the gateway and the sensor to establish a secured connection between the gateway and the sensor.

2. The method of claim 1, further comprising:
   receiving a whitelist from a server, the whitelist including security information for pairing the gateway and the sensor; and
   in response to receiving the whitelist, pairing the gateway and the sensor based on the security information.

3. The method of claim 1, wherein the gateway is in a first power saving mode and the sensor is in a second power saving mode.

4. The method of claim 3, wherein the first and second power saving modes are time synchronized.

5. The method of claim 3, wherein during the first power saving mode, the gateway wakes up at a regular time interval.

6. The method of claim 5, wherein the sensor has no motion detection capability, and during the second power saving mode, the sensor wakes up at a same time interval as the gateway.

7. The method of claim 3, wherein the sensor has a motion detection capability, and during the second power saving mode, the sensor wakes up in response to detecting a motion event.

8. The method of claim 1, wherein the secured connection between the gateway and the sensor uses at least one of a Bluetooth, a Bluetooth Low Energy (BLE), an Institute of Electrical and Electronics Engineers (IEEE) 802.15.4, an IEEE 802.11, or a SubGHz technology.

9. A gateway, comprising:
   a memory; and
   at least one hardware processor communicatively coupled with the memory and configured to:
      determine that no neighboring gateway is present;
      in response to determining that no neighboring gateway is present, start a sensor discovery process, wherein the sensor discovery process comprises:
         measuring signal strengths from a plurality of sensors;
         based on the measured signal strengths, identifying a sensor from the plurality of sensors to be paired with the gateway; and
         in response to identifying the sensor, pairing the gateway and the sensor to enable a secured connection between the gateway and the sensor.

10. The gateway of claim 9, wherein the at least one hardware processor is further configured to:
    receive a whitelist from a server, the whitelist including security information for pairing the gateway and the sensor; and
    in response to receiving the whitelist, pair the gateway and the sensor based on the security information.

11. The gateway of claim 9, wherein the gateway is in a first power saving mode and the sensor is in a second power saving mode, and the first and second power saving modes are time synchronized.

12. The gateway of claim 11, wherein during the first power saving mode, the gateway wakes up at a regular time interval.

13. The gateway of claim 12, wherein the sensor has no motion detection capability, and during the second power saving mode, the sensor wakes up at a same time interval as the gateway.

14. The gateway of claim 11, wherein the sensor has a motion detection capability, and during the second power saving mode, the sensor wakes up in response to detecting a motion event.

15. A non-transitory computer-readable medium containing instructions which, when executed, cause a gateway to perform operations comprising:
    determining that no neighboring gateway is present;
    in response to determining that no neighboring gateway is present, starting, by the gateway, a sensor discovery process, wherein the sensor discovery process comprises:
       measuring signal strengths from a plurality of sensors;
       based on the measured signal strengths, identifying a sensor from the plurality of sensors to be paired with the gateway; and
       in response to identifying the sensor, pairing the gateway and the sensor to enable a secured connection between the gateway and the sensor.

16. The non-transitory computer-readable medium of claim 15, wherein the operations further comprise:
    receiving a whitelist from a server, the whitelist including security information for pairing the gateway and the sensor; and
    in response to receiving the whitelist, pairing the gateway and the sensor based on the security information.

17. The non-transitory computer-readable medium of claim 15, wherein the gateway is in a first power saving mode and the sensor is in a second power saving mode, and the first and second power saving modes are time synchronized.

18. The non-transitory computer-readable medium of claim 17, wherein during the first power saving mode, the gateway wakes up at a regular time interval.

19. The non-transitory computer-readable medium of claim 18, wherein the sensor has no motion detection capability, and during the second power saving mode, the sensor wakes up at a same time interval as the gateway.

20. The non-transitory computer-readable medium of claim 17, wherein the sensor has a motion detection capability, and during the second power saving mode, the sensor wakes up in response to detecting a motion event.

\* \* \* \* \*